Patented Nov. 6, 1923.

1,473,543

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

CATALYST AND METHOD OF MAKING THE SAME.

No Drawing.   Application filed April 30, 1921.   Serial No. 465,756.

*To all whom it may concern:*

Be it known that I, JOHN COLLINS CLANCY, a subject of the King of Great Britain, residing at Providence, in the county of Providence and State of Rhode Island, have invented certain new and useful Improvements in Catalysts and Methods of Making the Same, of which the following is a specification.

This invention relates to an improved catalyst and method of making the same.

One object of the invention is to provide an improved catalyst for ammonia synthesis whereby a particularly efficient product is obtained in a comparatively simple and inexpensive manner.

Another object of the invention is to provide an improved method of treating material for rendering the same effective as a catalyst for ammonia synthesis.

Other objects and advantages of the invention relate to the utilization of improved materials and means for forming active catalytic material, together with improved steps and combinations of steps utilized in treating the same to promote the efficiency of the catalyst and increase the effectiveness of the synthetic operation.

In the synthesis of ammonia from its elements and the production of active ammonia synthesis catalysts as employed heretofore, the simple and complex cyanogen salts of alkali and alkali earth metals such as the ferri and ferro cyanids have been treated to form catalytically active carbo-nitrogenous compound of such metals, the preliminary treatment generally comprising the heating of the materials employed in an atmosphere of hydrogen, nitrogen or hydrogen and nitrogen at temperatures ranging from 600° to 1000° C.

I have found that the process may be readily carried out with excellent results by the use of an improved material formed from the non-cyanogen bearing compounds of alkali and alkali earth metals such as the organic salts of alkalinous metals including general metal aliphatic compounds and metal carbo-cyclic compounds, and more particularly the formates, acetates, oxalates, tartrates and phenolates of alkali or alkali earth metals, and the corresponding alkali or alkali earth metal complexes.

The above mentioned organic salts of alkalinous metals are, I have found, much superior to the materials previously employed in the formation of ammonia synthesis catalysts since they may be converted into catalytically active materials at considerably lower temperatures than those generally employed heretofore, and are capable of utilization in effecting the synthetic operation at such temperatures as to insure a high yield of ammonia. These organic salts are particularly effective as catalysts when treated in the manner which I am now about to describe for preparing and activating the same.

The simple organic salts of alkalinous metals generally including formates, acetates, oxalates, tartrates and phenolates, and the complex organic salts corresponding thereto are readily converted into active catalytic material by being heated in an atmosphere of dry ammonia gas to a temperature of between 350° and 1000° C. This treatment converts the said salts into carbo-nitrogenous compounds which are apparently in the nature of cyanamids or cyanids of the corresponding metals and are extremely efficient for effectuating the synthesis of ammonia from its elements. That is, the above salts of the divalent elements such, for example, as calcium, barium, glucinum, strontium and the like appear to be converted, at least in part, to corresponding cyanamids, while similar salts of the monovalent metals appear to be converted, at least in part, to the corresponding cyanids. A similar result appears to be effected when the corresponding non-cyanogen bearing double salts of the alkali and alkali earth metal organic compounds are treated with ammonia gas in the manner above described. Among the organic salts above mentioned which I have found to be especially adapted for use in the forming of catalysts for ammonia synthesis are calcium formate, calcium oxalate, potassium oxalate, calcium and potassium acetate and barium carbonate. One important advantage derived from the use of organic salts as above described, is due to the fact that when treated with ammonia gas these salts are converted into active catalytic material at a much lower temperature than the cyanids of the corresponding alkalinous metals.

Other important advantages to be derived from the use of the above described non-cyanogen-bearing compounds and complexes thereof over the preparing of cyanamids or other catalytically active carbonitrogenous compounds by the use of ferrocyanid or other cyanogen bearing compounds is due to the fact that when using the said organic acid compounds any desired proportion of heavy metal or heavy metal compound may be incorporated with the mass, for example, taking calcium carbonate I may add to this at least 50% of its weight of any iron compound, or in fact, any heavy metal or metal bearing compound such as, manganese carbonate, uranium acetate, cobalt acetate, iron oxalate, or double compounds of the same with organic acid, or the carbo-cyclic series of organic compounds, and thus bring about the formation in situ of the metal or metals intimately incorporated with the said alkali or alkali earth metal to form a catalyst. Another advantage derived from using the above described salts or compounds over the use of ferrocyanids or other complex cyanogen bearing material is due to the fact that the use of these substances permits the mass of material to be shaped into any desired form prior to its treatment with ammonia, and these formed or shaped pieces of catalytic material can be made so hard by the use of suitable proportions of the carbonates, oxalates, and the like, that they will stand up in the autoclave without having any support provided except their own material, while the cyanogen bearing compounds usually require distributive support such as pumice or the like.

As an example of the method which I may employ in forming an ammonia synthesis catalyst from the organic salts above described, I treat potassium titanium oxalate with water to render the same plastic and then form the material into small lumps, from one-fourth to one-half inch in diameter, and thoroughly dry the same at a temperature of, for example, from 100° to 150° C. When the material has been thoroughly dried, I charge the same into a suitable receptacle such as an iron pipe or autoclave, and heat to a temperature of from 350° to 1000° C., preferably to a temperature of approximately 500° C., in an atmosphere of ammonia gas. This latter treatment converts the oxalate into a corbo-nitrogenous compound which appears to be in the nature of a mixture of potassium and titanium cyanamids, the resulting mass being highly efficient as a catalyst for ammonia synthesis.

The treatment with ammonia gas as above described is preferably accomplished under pressure—that is, at a pressure greater than normal atmospheric pressure, although it may be accomplished at atmospheric pressure. I propose to employ in this connection pressures ranging from 1 to 100 atmospheres, and find that at the higher pressures the conversion is more rapid and complete than when atmospheric or substantially atmospheric pressure is employed. The ammonia gas used in the treating of the material to convert the same into a catalytically active product is anhydrous or substantially anhydrous.

I may mix the above mentioned organic salts with heavy metals or compounds of the same, before subjecting them to heating in an atmosphere of ammonia gas as above described, so that the heavy metals in finely divided form or carbo-nitrogenous compounds of the same will be distributed throughout the catalytic mass and serve to increase the effectiveness of the catalyst. Among the metals which I regard as particularly adapted for such use are iron, cobalt, thorium and manganese either in their pure state and in finely divided condition, or the carbonates, hydrates, oxids or organic acid salts of the same.

When the carbonates of the heavy metals above described, or any of them are employed in this connection they are converted during the treating of the material with hot ammonia gas to carbo-nitrogenous compounds of such metals which are probably in the nature of cyanamids, thus forming a catalytic mass which appears to be in the nature of a mixture of cyanamids of alkalinous and heavy metals.

Among other advantages obtained from the use of organic salts of alkalinous metals as above described, is that by reason of the lower temperatures required to convert the same to catalytically active material, there is less sintering or densifying of the catalyst during the treatment and consequent'y the catalyst is more readily permeated by the gases to be synthesized with consequent increased yield of ammonia.

When the catalyst has been prepared as above described I place the same in the working autoclave, being careful to exclude air therefrom during the transfer, and then pass a mixture of nitrogen and hydrogen gases into contact therewith under suitable conditions of temperature and pressure for the formation of ammonia. I have found that for the most efficient carrying out of the synthetic operation it is desirable to use temperatures of from 400° to 550° C. while the gases to be synthesized are preferably maintained under pressure of from 15 to 100 atmospheres.

By the term alkalinous metal as employed in the specification and claims I intend to designate those metals commonly known as alkali metals as well as those commonly designated as alkali earth metals. The term carbo-nitrogenous as employed in the specification and claims is intended to designate a compound containing carbon and nitrogen whether the proportions of these substances and their bonded relation to each other and the base is such as to bring the compound within the class generally designated as cyanamids or not. While for the purpose of avoiding circumlocution in the specification and claims I have referred to organic salts of alkalinous metals for the purpose of designating the substances which I propose to utilize in the formation of my improved catalyst and in the synthesis of ammonia through the agency of the same it is to be understood that this term is not employed in a limiting sense but as covering generally the organic salts of alkali and alkali earth metals (both simple and complex) which have been designated generally in the above specification as capable of being utilized for the purpose specified.

Although I have described in considerable detail certain precise steps and sequence of steps which I have found it desirable to employ, as well as certain particular substances and compounds which I have found to be efficient in use, in order to make clear to those skilled in the art one method of practicing the invention, it is to be understood that I do not desire or intend to be limited to the precise materials designated as preferred nor the exact steps or sequence of steps indicated as preferred, except as the same may be included within the terms of the following claims when broadly construed in the light of my invention.

Having described my invention, what I claim is:

1. A catalyst for ammonia synthesis which comprises a catalytically active carbo-nitrogenous compound formed by treating an organic salt of an alkalinous metal with ammonia gas at an elevated temperature.

2. A catalyst for ammonia synthesis which comprises a catalytically active carbo-nitrogenous compound formed by treating an organic salt of an alkalinous metal with ammonia gas at an elevated temperature and under pressure.

3. A catalyst for ammonia synthesis which comprises a catalytically active carbo-nitrogenous compound formed by treating an organic salt of an alkalinous metal with ammonia gas at a temperature of approximately 500° C.

4. A catalyst for ammonia synthesis which comprises a catalytically active carbo-nitrogenous compound formed by treating an organic salt of an alkalinous metal with ammonia gas at a temperature of approximately 500° C. and under pressure.

5. A catalyst for ammonia synthesis which comprises a catalytically active mass formed by treating material containing an organic salt of an alkalinous metal and a heavy metal with ammonia gas at an elevated temperature.

6. A catalyst for ammonia synthesis which comprises a catalytically active mass formed by treating material containing an organic salt of an alkalinous metal and a heavy metal with ammonia gas at an elevated temperature and under pressure.

7. A catalyst for ammonia synthesis which comprises a catalytically active mass formed by treating material containing an organic salt of an alkalinous metal and a heavy metal with ammonia gas at approximately 500° C.

8. A catalyst for ammonia synthesis which comprises a catalytically active mass formed by treating material containing an organic salt of an alkalinous metal and a heavy metal with ammonia gas at approximately 500° C. under pressure.

9. A catalyst for ammonia synthesis which comprises a catalytically active material formed by treating a complex organic salt of an alkalinous metal with ammonia gas at an elevated temperature.

10. A catalyst for ammonia synthesis which comprises a catalytically active material formed by treating a complex organic salt of an alkalinous metal with ammonia gas at an elevated temperature and under pressure.

11. A catalyst for ammonia synthesis which comprises a catalytically active mass formed by treating material containing a complex organic salt and a heavy metal with ammonia gas at an elevated temperature.

12. A catalyst for ammonia synthesis which comprises a catalytically active mass formed by treating material containing a complex organic salt and a heavy metal with ammonia gas at an elevated temperature and under pressure.

13. A catalyst for ammonia synthesis which comprises a catalytically active material formed by treating an oxalate of an alkalinous metal with ammonia gas at an elevated temperature.

14. A catalyst for ammonia synthesis which comprises a catalytically active material formed by treating an oxalate of an alkalinous metal with ammonia gas at an elevated temperature and under pressure.

15. A catalyst for ammonia synthesis which comprises a catalytically active mass formed by treating material containing an oxalate of an alkalinous metal and a heavy metal with ammonia gas at an elevated temperature.

16. A catalyst for ammonia synthesis which comprises a catalytically active mass formed by treating material containing an oxalate of an alkalinous metal and a heavy metal with ammonia gas at an elevated temperature and under pressure.

17. The process of producing a catalytically active carbo-nitrogenous compound of an alkalinous metal which comprises treating an organic salt of said metal with hot ammonia gas.

18. The process of producing a catalytically active carbo-nitrogenous compound of an alkalinous metal which comprises treating an organic salt of said metal with hot ammonia gas under pressure.

19. The process of producing a catalytically active carbo-nitrogenous compound of an alkalinous metal and a heavy metal which comprises treating material containing an organic salt of an alkalinous metal and a heavy metal with ammonia gas at an elevated temperature.

20. The process of producing a catalytically active carbo-nitrogenous compound of an alkalinous metal and a heavy metal which comprises treating material containing an organic salt of an alkalinous metal and a heavy metal with ammonia gas at an elevated temperature and under pressure.

In testimony whereof I have affixed my signature.

JOHN COLLINS CLANCY.